May 21, 1957 A. MEREL 2,792,694
ELASTIC COUPLING DEVICES
Filed July 28, 1954

INVENTOR
ANDRÉ MEREL,
BY
ATTORNEYS.

United States Patent Office 2,792,694
Patented May 21, 1957

2,792,694

ELASTIC COUPLING DEVICES

André Mérel, Paris, France, assignor to Societe Generale de Mecanique et de Metallurgie, Vanves, France, a society of France Application July 28, 1954, Serial No. 446,201

Claims priority, application France August 4, 1953

4 Claims. (Cl. 64—11)

The present invention relates to elastic coupling devices for transmitting a torque from a driving shaft to a driven shaft.

The object of my invention is to provide a device of this kind which is better adapted to meet the requirements of practice than those used for the same purposes up to the present time.

The coupling device according to my invention includes at least one mass of a resilient material provided with a screw-threaded shaped hole in which the correspondingly shaped end of one of said shafts is engaged, the axial sections of said screw-threaded hole and said shaft end being of rounded shape, i. e. without sharp points, the other shaft being coupled with said mass.

Other features of my invention will become apparent in the course of the following detailed description of some specific embodiments thereof with reference to the accompanying drawings, given merely by way of example, and in which.

Figure 1:
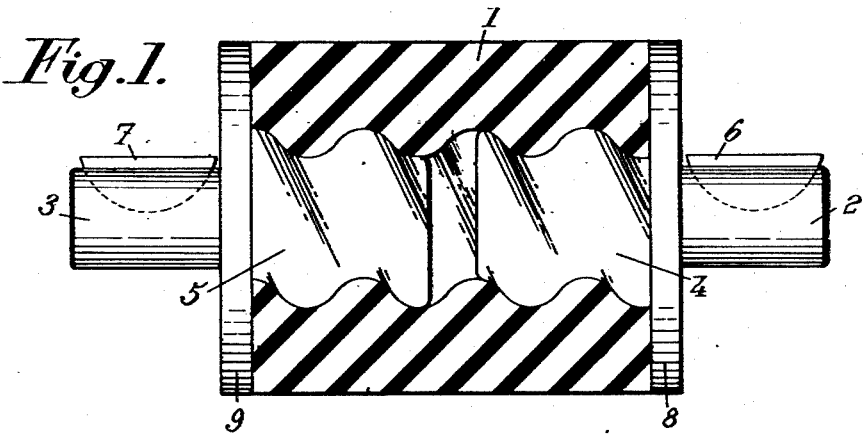
Fig. 1 is a diagrammatic axial sectional view of an elastic coupling device according to an embodiment of my invention.

My invention is concerned with coupling devices to be provided between a driving shaft and a driven shaft for transmission of a torque from one to the other, said shafts being possibly oblique with respect to each other and this obliquity being possibly variable.

The essential element of this coupling device consists in a solid block 1 of a resilient material, for instance rubber, either natural or synthetic. The driving and driven shafts, respectively designated by 2 and 3, are provided with portions 4 and 5 of screw-threaded shape, but such that their sections by planes passing through the axis of the shaft are of rounded shape, that is to say include no sharp points. In other words, the radius of curvature of such a section varies continuously along said section and is always above a given value. In the embodiments illustrated by the drawings, these axial sections of the screw-threaded portions 4 and 5 of the shaft are constituted by a series of circular arcs having their centres alternately above and under the section line and joined to each other. But of course other sections complying with the requirements of a continuously rounded shape might be used according to my invention.

Thus, there is no danger of tearing or wearing off the matter of block 1 in which the shaft portions 4 and 5 are engaged.

Block 1 is provided with holes also of screw-threaded shapes corresponding with those of shaft portions 4 and 5 so that said shaft portions can be screwed in the holes formed in block 1.

It should be noted that no hooping, either metallic or not, and/or no metal wiring or the like are provided to form an envelope preventing volume variations of block 1 and surrounding said block. Keys 6 and 7 of the Woodruff type serve to connect shaft portions 2 and 3 with other shaft elements.

When a torque is exerted by driving shaft 2, this torque is transmitted through the helical surfaces in engagement with one another, first from shaft portion 4 to the elastic material of block 1, then from block 1 to shaft portion 5. Block 1 ensures a resilient transmission. In particular, shafts 2 and 3 may be out of alinement with each other and their obliquity to each other may vary in the course of one revolution (the axis of at least one of them describing for instance a conical surface), but the resilient material of the block is capable of supporting quick variations of the driving torque.

In order to take the coupling device to pieces it suffices to unscrew shaft portions 4 and 5 from block 1. The cleaning of such a coupling device is of course very easy, which is very important when the coupling device is used in a machine for the treatment of liquids capable of fermenting or of producing noxious deposits, for instance machines treating food products such as milk.

Of course, a coupling device as above described can transmit torque in only one direction of rotation. But if the driving torque becomes too high, portion 4 can slip by an angle corresponding to one screw-thread and fit again in the next thread. Therefore the coupling device also acts as an automatic torque limiting device.

In the construction illustrated by Fig. 1, shafts 4 and 5 are provided with discs 8 and 9 applied against the ends of block 1 and the holes in which shaft portions 4 and 5 are screwed communicate with each other forming thus a single hole. Portions 4 and 5 cannot come in contact with each other even when the block 1 is squeezed between parts 8 and 9.

Such a coupling device is used in connection with structures in which, in addition to the torque transmitted from one shaft to the other, a compression thrust is exerted from one shaft on the other. This thrust is supported by end discs 8 and 9.

Figure 2:
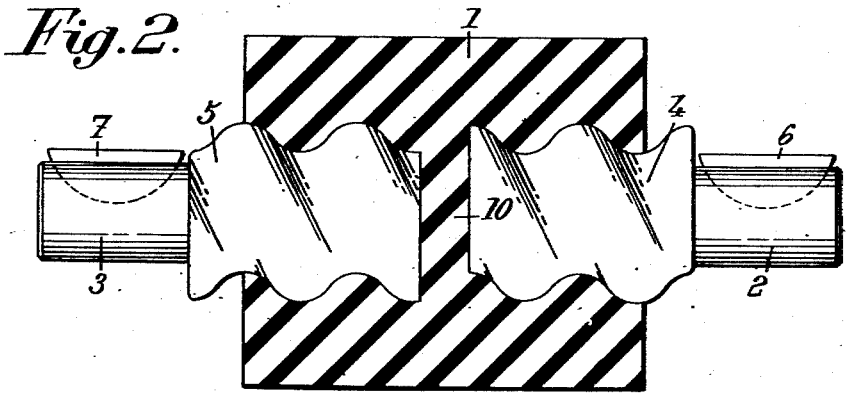
Fig. 2 is a similar view showing a second embodiment.

In the construction of Fig. 2, there are no plates such as 8 and 9 but the holes accommodating shaft portions 4 and 5 do not communicate with each other and a partition 10 is provided between these holes. This coupling device is intended to be used when the shafts, in addition to the torque they transmit to each other, also exert a pull away from each other. Partition 10 increases the strength of the block and makes it possible to engage shaft portions 4 and 5 fully into the corresponding holes of piece 1.

Figure 3:
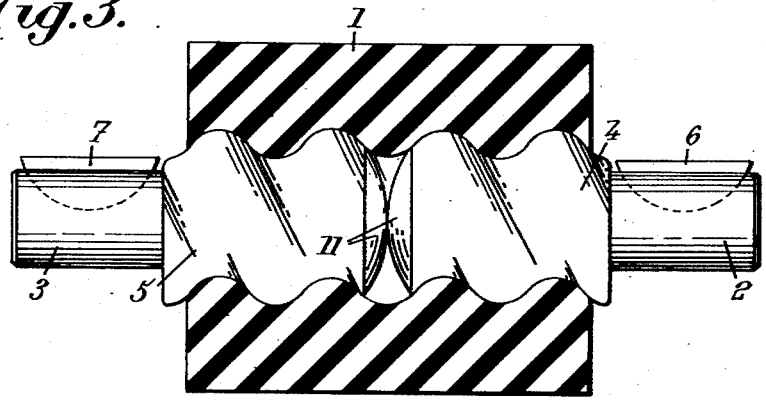
Fig. 3 is also a similar view showing a third embodiment.

In the construction of Fig. 3, the portions 4 and 5 of the shafts are provided with spherical ends 11 adapted to bear against each other and thus to transmit a thrust from one shaft to the other whatever be their relative obliquity (within given limits). In this case, block 1 serves to transmit the driving torque and permits an oblique thrust transmission from one shaft to the other, but said block does not transmit any axial thrust component.

Of course the embodiments shown by Figs. 1, 2 and 3 are not the only possible ones within the scope of my invention. In particular, resilient block 1 might be made of several elements. Furthermore the shafts might have no screw-threaded shaped ends but be fixed each to one half of a block provided with a screw-threaded hole and a screw-threaded shaft portion would be mounted in this hole.

Also one of the shafts might be fixed to the rubber block and the screw-threaded connection would exist only between the remainder of this block and the other shaft. The first mentioned shaft could be assembled with and disassembled from the block by means of a key or any other suitable device. It should also be well understood that although, in the embodiments illustrated by the drawings, the shaft portions such as 4 and 5 fit exactly in corresponding holes of the resilient mass 1, this is not a necessity according to my invention and some play may be provided between each hole provided in the resilient mass and the corresponding shaft portions, this play existing either radially or longitudinally or both.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A coupling device which comprises, in combination, a mass of a resilient material provided with at least one screw-threaded hole of uniform cross section throughout forming a female screw, a shaft, a male screw integral with one end of said shaft and in line therewith, said male screw being shaped and dimensioned to fit in said female screw, said male screw being screwed in said hole, said screws having rounded threads, another shaft, and means for assembling said second mentioned shaft with said mass of resilient material to hold said two shafts in line with each other when said mass of resilient material is undeformed.

2. A coupling device which comprises, in combination, a mass of a resilient material provided with a screw-threaded hole of uniform cross section throughout forming a female screw, said hole extending throughout said mass, a shaft, a male screw integral with one end of said shaft and in line therewith, said male screw being shaped and dimensioned to fit in said female screw, said male screw being screwed in said hole from one end thereof, another shaft, a male screw integral with one end of said second mentioned shaft and in line therewith, said second mentioned male screw being shaped and dimensioned to fit in said female screw, said second mentioned male screw being screwed in said hole from the other end thereof, an annular plate rigid with each of said shafts perpendicularly thereto at the end of said shaft where it carries the corresponding male screw, the total length of said male screws being smaller than the length of said hole.

3. A coupling device which comprises, in combination, a mass of a resilient material provided with two screw-threaded holes each of uniform cross section throughout and forming each a female screw, said two holes having a common axis, said holes extending from opposed faces of said mass respectively and stopping short of each other so that a partition of resilient material is left between said two holes, a shaft, a male screw integral with one end of said shaft and in line therewith, said male screw being shaped and dimensioned to fit in one of said female screws, said male screw being screwed in said last mentioned female screw, another shaft, and a male screw integral with one end of said second mentioned shaft and in line therewith, said second mentioned male screw being shaped and dimensioned to fit in said second mentioned female screw, said second mentioned male screw being screwed in said second mentioned female screw.

4. A coupling device which comprises, in combination, a mass of a resilient material provided with a screw-threaded hole of uniform cross section throughout forming a female screw, said hole extending throughout said mass, a shaft, a male screw integral with one end of said shaft and in line therewith, said male screw being shaped and dimensioned to fit in said female screw, said male screw being screwed in said hole from one end thereof, another shaft, and a male screw integral with one end of said second mentioned shaft and in line therewith, said second mentioned male screw being shaped and dimensioned to fit in said female screw, said second mentioned male screw being screwed in said hole from the other end thereof, the respective free ends of said male screws being rounded and in contact with each other, the total length of said male screws being approximately equal to the length of said hole.

References Cited in the file of this patent

FOREIGN PATENTS 613,428    Germany _____ May 18, 1935